United States Patent

[11] 3,588,672

[72] Inventor George R. Wilson
Beaverton, Oreg.
[21] Appl. No. 704,106
[22] Filed Feb. 8, 1968
[45] Patented June 28, 1971
[73] Assignee Tektronix, Inc.
Beaverton, Oreg.

[54] REGULATOR CONTROLLED BY VOLTAGE ACROSS SEMICONDUCTOR JUNCTION DEVICE
10 Claims, 8 Drawing Figs.

[52] U.S. Cl. .......... 323/4, 307/297
[51] Int. Cl. .......... G05f 1/56
[50] Field of Search .......... 307/297, 296, 287; 323/1, 4, 17, 22 (T), 38

[56] References Cited

UNITED STATES PATENTS

| | | | |
|---|---|---|---|
| 2,991,407 | 7/1961 | Murphy .......... | 323/4 |
| 3,235,775 | 2/1966 | Winston .......... | 323/4X |
| 3,246,233 | 4/1966 | Herz .......... | 323/4 |
| 3,303,413 | 2/1967 | Warner, Jr. et al. .......... | 323/4 |
| 3,320,439 | 5/1967 | Widlar .......... | 323/22X(T) |

OTHER REFERENCES

" Applicant' s Non-Pat. Citations" Watson, G., " Two Transistors Equal One Constant-Current Diode", Electronics, July 6, 1962, pgs. 50— 52.

F. C. Allen, " Two Terminal Constant-Current Device", EEE Vol. 13 No. 10, October 1965, pgs. 71, 72

Anzani, " Current Generator Made With Four Parts", Electronic Design Vol. 16 No. 3, Feb. 1, 1968 pg. 134 (Copy in 323- 1)

*Primary Examiner*—J. D. Miller
*Assistant Examiner*—A. D. Pellinen
*Attorney*—Buckhorn, Blore, Klarquist and Sparkman

ABSTRACT: A current regulating circuit or current source includes a first transistor connected in series with a semiconductor junction device for developing a voltage proportional to the current flowing through such first transistor. A second transistor has its base connected to the semiconductor junction device whereby current in the second transistor is modified in response to the voltage across the junction device. In turn, the collector of the second transistor is connected so that it controls the first transistor in a sense for opposing change in the output current of the first transistor. The semiconductor junction device preferably comprises the base-emitter junction of a third transistor, and all three transistors are desirably fabricated upon a common semiconductor integrated circuit structure.

GEORGE R. WILSON
INVENTOR
BY
BUCKHORN, BLORE, KLARQUIST & SPARKMAN
ATTORNEYS

REGULATOR CONTROLLED BY VOLTAGE ACROSS SEMICONDUCTOR JUNCTION DEVICE

BACKGROUND OF THE INVENTION

Frequently a substantially constant current is desired in electronic circuitry, and requires the interposition of a constant current means between a conventional power supply and the circuit load. One such constant current means comprises simply a resistor having a rather large value of resistance, such that the current delivered therethrough is nearly constant despite changes in load. Another commonly used constant current source comprises a transistor for delivering an output current at its collector and having its base connected to a reference potential. The source impedance then equals the rather large output resistance of the transistor, whereby a substantially constant current is delivered despite load changes. However, current source means of the foregoing types provide only a relatively constant current, and, of course, assume a load impedance of smaller impedance than the source.

SUMMARY OF THE INVENTION

According to the present invention a current regulating circuit or current source includes a first transistor for delivering output current to a load, and a semiconductor junction device substantially through which such current flows. A second transistor has its control terminal coupled to the semiconductor junction device such that current in the second transistor is modified in response to the voltage across the semiconductor junction device, and therefore in response to the output current. Means couple the output of the second transistor to the control terminal of the first transistor in a sense for opposing change in the output current at the first transistor. It can be shown that the effective output resistance of the circuit is approximately $R_0(1+\beta)$ where $R_0$ is the output resistance of the first transistor, and $\beta$ is the current gain factor for the transistors.

The above mentioned semiconductor junction device is substantially coupled across the input of the second transistor and desirably exhibits a voltage vs. current characteristic matching that of the base-emitter junction of the second transistor. Control of the output current is then linear despite changes in temperature and current. The semiconductor junction device preferably comprises the base-emitter junction of a third transistor, and all three transistors are desirably fabricated upon a common semiconductor integrated circuit structure.

It is therefore an object of the present invention to provide an improved current regulating circuit or current source having a large output impedance.

It is a further object of the present invention to provide an improved transistorized current regulating circuit or current source of simple construction and one adapted for integrated circuit fabrication.

It is another object of the present invention to provide an improved current source, the current output of which is readily controllable.

It is a further object of the present invention to provide an improved substantially constant current source employing a minimum of supply connections and adapted for operation from available supply currents.

It is another object of the present invention to provide an improved substantially constant semiconductor current source which is accurate in operation and the output of which is substantially constant despite changes of temperature.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
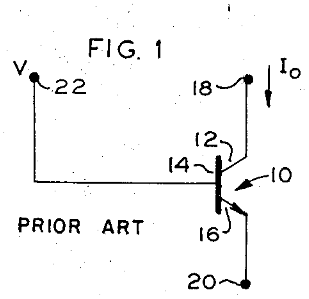
FIG. 1 is a schematic diagram of a prior constant current circuit.

FIG. 1 illustrates a conventional current regulating circuit or constant current source comprising merely a transistor. The transistor 10 includes a collector 12, a base 14, and an emitter 16 wherein the principal current carrying path or collector-emitter path regulates the output current $I_o$ flowing into terminal 18 and out of return terminal 20. Base 14 is connected to a reference voltage V at terminal 22. If, for example, the output current $I_o$ tends to increase, the voltage across the emitter resistance of transistor 10 increases relative to the voltage V such that $I_o$ tends to be returned towards a constant value. While this circuit presents a reasonably high impedance at terminal 18, the impedance equals the output resistance of transistor 10.

Figure 2:
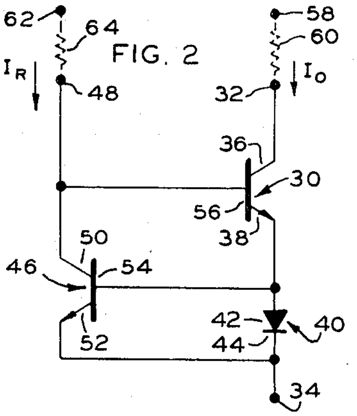
FIG. 2 is a schematic diagram of a constant current circuit according to the present invention.

FIG. 2 illustrates a circuit according to the present invention for presenting a higher output impedance. In this circuit a first transistor 30 has its principal current carrying path interposed between output terminal 32 and common return terminal 34. The principal current carrying path of transistor 30 is defined by the principal current carrying terminals, here comprising collector 36 connected to output terminal 32, and emitter 38 coupled to common return terminal 34 via semiconductor junction device or diode 40. The anode terminal 42 of diode 40 is connected to emitter 38, and the cathode terminal 44 of diode 40 is connected to common return terminal 34.

A second transistor 46 has its principal current carrying path disposed in circuit between a second terminal or control current terminal 48 and common return terminal 34. The current carrying path of transistor 46 is defined by principal current carrying terminals here comprising collector 50 connected to terminal 48 and emitter 52 connected to terminal 34. The base 54 of transistor 46 is connected to the juncture between emitter 38 of transistor 30 and anode 42 of diode 40, while the collector 50 of transistor 46 is connected to the base of transistor 30. It is understood that current $I_o$ is suitably provided from a conventional power supply, indicated at terminal 58, through a resistance 60. Resistance 60, illustrated by dashed lines represents the load through which current $I_o$ flows. Likewise, a regulating or control current $I_R$ is provided at terminal 48, e.g. from a power supply terminal 62, through a large resistance 64 illustrated by dashed lines.

During operation, the circuit according to FIG. 2 functions to provide feedback whereby the current $I_o$ is, to a large extent, held constant. If the current $I_o$ tends to increase, the current through diode 40, which in large part comprises $I_o$, also increases, and the voltage drop across diode 40 increases. Therefore, the voltage at the base of transistor 46 increases whereby the voltage at the collector 50 of transistor 46 decreases. Therefore the voltage at the base 56 of transistor 30 tends to decrease. A voltage decrease at base 56 is in a direction for causing the current $I_o$ to decrease, thereby causing restoration of the desired value of $I_o$. Similarly, if the current $I_o$ tends to decrease, the circuit tends to raise the voltage at base 56 for raising the value of $I_o$ towards its desired value The semiconductor junction device diode 40 is connected substantially across the base-emitter junction of transistor 46 and is disposed thereacross in substantially the same polarity sense as the base-emitter junction. Diode 40 functions to compensate for otherwise nonlinear action of transistor 46. It is desired that the current $I_o$ be held as constant as possible, and changes in the base-emitter resistance of transistor 46, brought about by changes in temperature, tend to result in an output current $I_o$ which varies with temperature. However, the semiconductor junction device comprising diode 40 suitably operates at the same temperature as transistor 46, and the junction resistance of diode 40 varies in the same manner as the base-emitter resistance of transistor 46. The devices may be maintained at the same temperature in a manner hereinafter more fully disclosed. The circuit therefore compensates for errors that otherwise might occur as a result of changes in temperature. As also will be understood by those skilled in the art, the semiconductor junction comprising the base-emitter junction of transistor 46, and the junction comprising diode 40, each exhibit an exponential voltage vs. current characteristic. However, since diode 40 is connected substantially across the base-emitter junction of transistor 46, a given current through diode 40 will result in a linearly related output current from transistor 46. The current flowing in collector 50 in transistor 46 is thereby rendered a substantially linear function of the current flowing in diode 40.

Figure 3:
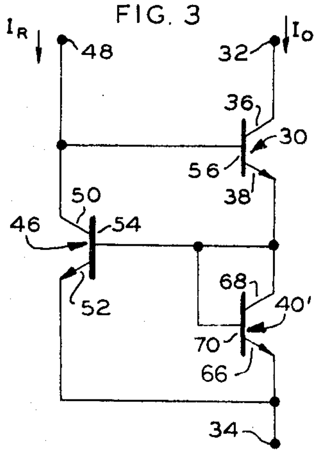
FIG. 3 is a schematic diagram of a preferred version of the FIG. 2 circuit.

A preferred form of the FIG. 2 circuit is illustrated in FIG. 3 wherein like elements are referred to by like reference numerals. Here, the semiconductor junction device or diode comprises a transistor 40' substantially similar in characteristics to transistor 46. Transistor 40' includes an emitter 66 connected to common return terminal 34. Transistor 40' also includes a collector terminal 68 and a base terminal 70 which are connected together. The collector 68 of transistor 40' is connected to the base 70 thereof to provide feedback for enhancing the exponential characteristic of transistor 40'. The common connection of the base and collector terminals of transistor 40' is connected to the emitter 38 of transistor 30, and to base 54 of transistor 46.

If transistors 46 and 40' are identical and reside at the same temperature, current flow through transistor 40' sets up a voltage thereacross which is exactly that required, when applied to base 54 of transistor 46 to cause an identical current to flow in the emitter 52 of transistor 46. The two currents, that is, in emitters 66 and 52, are then substantially equal regardless of temperature, and regardless of transistor nonlinearities. Operation of the FIG. 3 circuit is substantially the same as the FIG. 2 circuit, but may be explained in an additional manner assuming the currents flowing through the principal current-carrying paths of transistors 46 and 40' are always the same. If output current $I_o$ tries to increase, then the current in collector 50 of transistor 46 increases by a substantially similar amount. Current $I_R$ is substantially constant, and since the current through transistor 46 is derived from $I_R$, then less current will be delivered to base 56 of transistor 30. As a result, the value of $I_o$ will decrease. In both the circuits of FIG. 2 and FIG. 3, it is understood that $I_o$ is a function of $I_R$, and moreover, if transistors 46 and 40' are the same and if they reside at the same temperature, currents $I_o$ and $I_R$ are substantially identical.

Figures 4, 5:
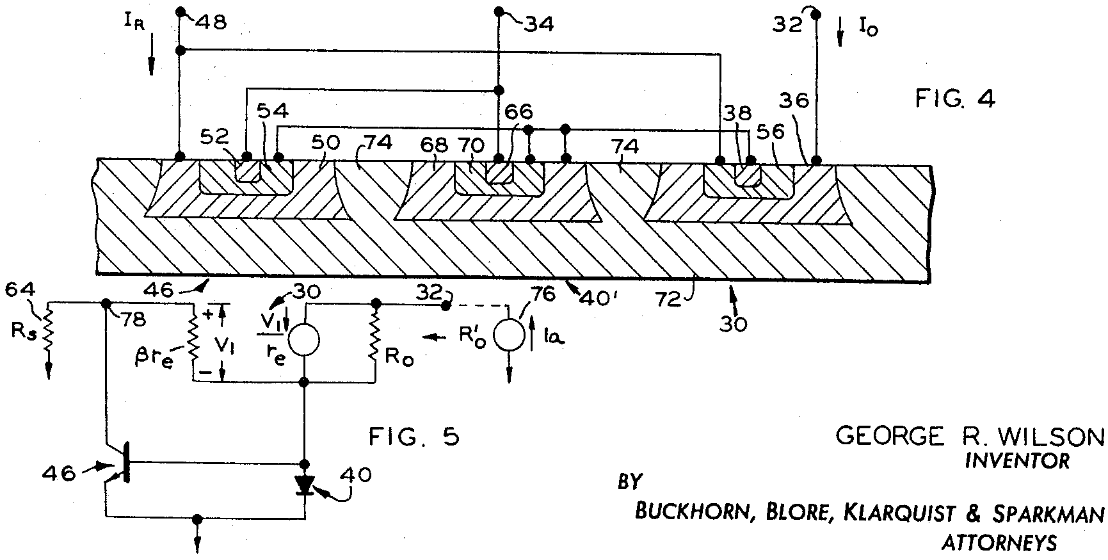
FIG. 4 is a cross section of an integrated circuit embodiment according to the present invention.
FIG. 5 is an equivalent circuit diagram of a circuit according to the present invention.

FIG. 4 illustrates an advantageous physical realization of FIG. 3 circuit utilizing integrated circuit techniques. In FIG. 4, the reference numerals refer to similarly numbered elements in the FIG. 3 circuit diagram. Referring to transistor 30, for example, collector 36 suitably comprises an N-type epitaxial layer upon P-type substrate 72. Emitter 38 comprises an N-type emitter diffusion, and base 56 is a P-type diffusion provided between the emitter diffusion and the epitaxial layer. P-type isolation diffusion regions 74 separate transistors 30, 40', and 46. The complete circuit comprises substantially only semiconductor devices and is accommodated economically in a small space. The transistors reside at the same temperature and are otherwise suitably substantially identical.

If, on the other hand, it is desired that output current $I_o$ be a multiple of control current $I_R$, then the areas of emitters 38, 66, and 52 are adjusted such that, for example, the emitters 38 and 66 are of equal area, while emitter 52 is smaller in area. Then the reference control current $I_R$ is smaller in proportion to the ratio of area of emitter 52 to the area of emitter 38 or emitter 66.

The output resistance for the circuit of the present invention may be calculated with the aid of the circuit of FIG. 5. The FIG. 5 circuit is equivalent to the circuit of FIG. 2 and like elements are referred to employing like reference numerals. An approximate transistor equivalent circuit is illustrated in place of transistor 30, and includes an input resistance $\beta r_e$ and an output resistance $R_o$. The output resistance $R_o$ is shunted by a current source delivering a current $V_1/r_e$. Transistor 46 and diode 40 are assumed identical devices, i.e. diode 40 may actually comprise the transistor 40' of FIG. 3, and therefore the current in the emitter-base junction of transistor 46 is identical to the current in diode 40. $R_s$ is the resistance of source resistor 64 through which a reference current is delivered.

The following calculations assume that all transistors are fabricated as illustrated in FIG. 4, and therefore have the same beta, the same emitter areas, and the same $r_e$. The output impedance for the FIG. 5 circuit can be expressed as the voltage across a 1-amp test current source 76 connected to output terminal 32. The resulting current through diode 40 will be $1a(1+1/\beta)$ or nearly 1 amp. The same current flows in transistor 46. The impedance at node 78 is the parallel combination of $\beta(2r_e)$ and $R_s$, or $2\beta r_e R_s/2\beta a r_e + R_s$, wherein $2\beta r_e$ is the input resistances of elements 30 and 40 in series. The voltage $V_1$ is then $$-\frac{1}{2}(1a)\frac{2\beta r_e R_s}{2\beta r_e + R_s}$$

The current through $$R_o \text{ equals } 1a - V_1/r_e = 1a\left(1+\frac{\beta R_s}{2\beta r_e + R_s}\right)$$

Neglecting the low dynamic resistance of element 40, the output voltage is $$(1a)R_o\left(1+\frac{\beta R_s}{2\beta r_e + R_s}\right)$$

and the output resistance equals $$R_o' = R_o\left(1+\frac{\beta R_s}{2\beta r_e + R_s}\right)$$

If $R_s$ is large, then the output resistance for the circuit at terminal 32 is larger than the output impedance $R_o$ of the transistor by a factor of $\beta+1$, representing a considerable increase in output impedance for the source.

Figure 6:
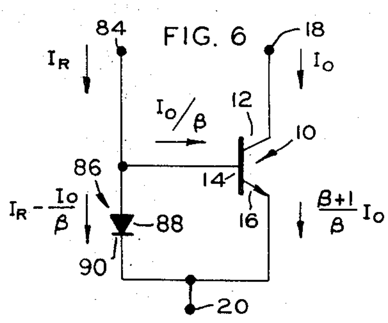
FIG. 6 is a schematic diagram of a comparison constant current circuit illustrating division of current flow therein.

FIG. 6 illustrates current distribution for a circuit similar to that of FIG. 1 provided with a diode 86 connected between base 14 of transistor 10 and common return terminal 20 for purposes of comparison. Diode 86 is employed for setting the voltage at base 14 of transistor 10. Anode 88 of diode 86 is connected to base 14 of transistor 10 as well as to a current control terminal 84 to which a reference or control current $I_R$ is delivered. The cathode 90 of diode 86 is connected to terminal 20. Diode 86 desirably matches the characteristics of transistor 10. Assuming the current $I_o$ flows into terminal 18, the resulting division of currents is illustrated. If the diode 86 and transistor 10 are substantially identical devices, the currents in the emitter 16 of transistor 10 and in diode 86 must be equal, that is, $$I_R - I_o/\beta = \frac{\beta+1}{\beta} I_o$$

Solving for $I_o$, $$I_o = I_R\left[1-\frac{2}{\beta+2}\right]$$

Figure 7:
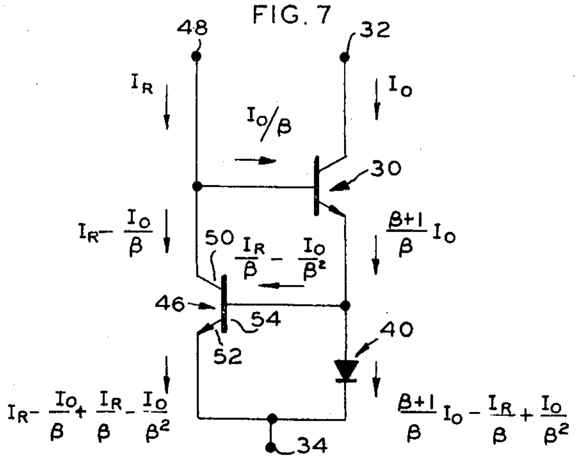
FIG. 7 is a schematic diagram of a constant current circuit according to the present invention illustrating division of the current flow therein.

FIG. 7 illustrates a circuit according to the present invention substantially similar to that of FIG. 2, and illustrating the division of currents. Again, if the various semiconductor devices are substantially identical, then the current in diode 40 must equal the current in emitter 52 of transistor 46, that is, $$I_R - I_o/\beta + I_R/\beta - I_o/\beta^2 = \frac{\beta+1}{\beta} I_o - I_R/\beta + I_o/\beta^2$$

Solving for $I_o$, $$I_o = I_R\left[1 - \frac{2}{\beta^2+2\beta+2}\right]$$

Thus the output current $I_o$ is shown to be a function of the reference or control current $I_R$. Moreover, the matching between the reference and output currents is superior with the circuit according to the present invention as illustrated in FIG. 7. It can be seen that the difference between the reference and output currents is greater in the case of the circuit according to FIG. 6 by a factor slightly greater than beta.

Although the circuit according to the present invention is of particular advantage as incorporated in integrated circuit structures because of the utilization of substantially only semiconductor junction devices, the circuit according to the present invention may also be fabricated employing standard transistors.

Figure 8:
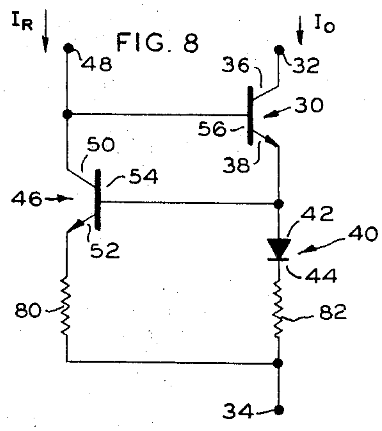
FIG. 8 is a schematic diagram of an alternative constant current circuit according to the present invention.

FIG. 8 illustrates a circuit substantially identical to that of FIG. 2, but adapted for standard transistor elements. A resistor 80 is added between the emitter 52 of transistor 46 and the common return terminal 34, and a resistor 82 is added between the cathode 44 of diode 40 and common return terminal 34. Adding these resistors allows the circuit to be utilized without substantially matching the base-emitter junction of transistor 46 with the diode 40 junction. Otherwise the circuit operates in substantially the manner of those hereinbefore described, and it is understood that diode 40 is again advantageously replaced with the base-emitter junction of a transistor having characteristics similar to those of transistor 46.

The current regulating circuit or current source according to the present invention not only delivers a substantially constant output current, having an output impedance which is greater by a factor of beta over that of a usual transistor current source, but also the circuit according to the present invention is simply and easily fabricated, especially in the case of integrated circuit devices. Moreover, the current regulating circuit devices. Moreover, the current regulating circuit does not require an external standard voltage and is provided with only one other current input terminal in addition to output and current return terminals. The additional input is suitably coupled to a source of current, which is most frequently available in semiconductor circuitry, and which may be used to control the value of the output current of the circuit according to the present invention.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A semiconductor current supply circuit comprising:
a first transistor connected to regulate an output current;
a semiconductor junction device substantially through which said output current flows;
a second transistor having an output terminal and a control terminal, wherein said control terminal is coupled to said semiconductor junction device so that the current in said second transistor is modified in response to the voltage across said semiconductor junction device;
means coupling the output from the output terminal of said second transistor to control said first transistor in a sense opposing change in said output current at said first transistor;
and means for coupling a source of control current to the output terminal of said second transistor.

2. The circuit according to claim 1 wherein said control terminal of said second transistor comprises the base terminal thereof, and wherein said semiconductor junction device comprises the base-emitter junction of a third transistor.

3. The circuit according to claim 2 wherein the collector of said third transistor is connected to the base thereof.

4. The circuit according to claim 1 wherein the respective transistors are fabricated upon a common semiconductor integrated circuit structure.

5. The circuit according to claim 1 including an output terminal coupled to said first transistor through which said output current flows from said first transistor, said circuit also including a common return terminal, wherein said semiconductor junction device is interposed between said first transistor and said common return terminal, said junction device being in series with principal current carrying path of said first transistor, with the control terminal of the second transistor being coupled to the terminal of the junction device remote from the common return terminal, and means returning the principal current carrying path of said second transistor to said common return terminal.

6. The circuit according to claim 1 wherein said semiconductor junction device comprises the base-emitter junction of a third transistor.

7. The circuit according to claim 6 wherein the base and collector of said third transistor are connected together.

8. The circuit according to claim 1 wherein said first transistor is also provided with an output terminal and a control terminal, with the output terminal of each such transistor comprising the collector terminal thereof while the control terminal comprises the base terminal thereof, the emitter of said first transistor being connected to the base of said second transistor as well as to said semiconductor junction device, wherein the junction device is disposed between the emitter of the first transistor and the emitter of the second transistor.

9. The circuit according to claim 8 wherein said semiconductor junction device is connected across the base-emitter junction of said second transistor in the same polarity sense as said base-emitter junction.

10. The circuit according to claim 9 further including a first resistor interposed between the emitter of the second transistor and a common return terminal, and a second resistor interposed between the semiconductor junction device and a common return terminal.

UNITED STATES PATENT OFFICE
CERTIFICATE OF CORRECTION

Patent No. 3,588,672 Dated June 28, 1971

Inventor(s) George R. Wilson

It is certified that error appears in the above-identified patent and that said Letters Patent are hereby corrected as shown below:

Title Page, in the title, before "REGULATOR" insert --CURRENT--

Col. 1, in the title, before "REGULATOR" insert --CURRENT--

Col. 4, line 31, "$2 \beta r_e R_S / 2 \beta a r_e + R_S$" should be $\frac{2\beta r_e R_S}{2\beta r_e + R_S}$ Col. 5, lines 46-47, delete "Moreover, the current regulating circuit devices."

Signed and sealed this 25th day of January 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O-366-334